(12) United States Patent
Vladan

(10) Patent No.: US 9,912,171 B2
(45) Date of Patent: Mar. 6, 2018

(54) WIRELESS POWER TRANSMITTER AND METHODS FOR USE THEREWITH

(71) Applicant: BROADCOM CORPORATION, Irvine, CA (US)

(72) Inventor: Marius Ionel Vladan, Oudenaarde (BE)

(73) Assignee: AVAGO TECHNOLOGIES GENERAL IP (SINGAPORE) PTE. LTD, Singapore (SG)

( * ) Notice: Subject to any disclaimer, the term of this patent is extended or adjusted under 35 U.S.C. 154(b) by 276 days.

(21) Appl. No.: 14/790,831

(22) Filed: Jul. 2, 2015

(65) Prior Publication Data

US 2016/0365737 A1 Dec. 15, 2016

Related U.S. Application Data

(60) Provisional application No. 62/174,383, filed on Jun. 11, 2015.

(51) Int. Cl.
| | | |
|---|---|---|
| *H02J 5/00* | (2016.01) | |
| *H02J 7/02* | (2016.01) | |
| *H02J 17/00* | (2006.01) | |
| *H02J 50/10* | (2016.01) | |
| *H02J 50/40* | (2016.01) | |

(52) U.S. Cl.
CPC ............. *H02J 5/005* (2013.01); *H02J 7/025* (2013.01); *H02J 50/10* (2016.02); *H02J 50/40* (2016.02)

(58) Field of Classification Search
CPC . H01F 38/14; H02J 5/005; H02J 7/025; H02J 17/00; H02J 50/10; H02J 50/12; H02J 50/40; H04B 5/0037; H04B 5/0075; H04B 5/0087; Y02T 90/122
USPC ........................................................ 307/104
See application file for complete search history.

(56) References Cited

U.S. PATENT DOCUMENTS

| | | | |
|---|---|---|---|
| 2012/0169139 A1* | 7/2012 | Kudo ...................... | H02J 17/00 307/104 |
| 2014/0070764 A1* | 3/2014 | Keeling .................. | H02J 50/50 320/108 |
| 2014/0312702 A1* | 10/2014 | Uchida .................... | H02J 17/00 307/80 |
| 2015/0015087 A1* | 1/2015 | Endo ........................ | H01F 38/14 307/104 |
| 2015/0022147 A1* | 1/2015 | Jung ........................ | H02J 5/005 320/108 |
| 2015/0116887 A1* | 4/2015 | Avestruz .............. | H05B 6/1272 361/152 |
| 2015/0145340 A1* | 5/2015 | Chiyo ...................... | H02J 5/005 307/104 |

(Continued)

*Primary Examiner* — Levi Gannon
(74) *Attorney, Agent, or Firm* — Garlick & Markison; Bruce E. Stuckman

(57) ABSTRACT

Aspects of the subject disclosure may include, for example, a wireless power transmitter that includes a coil assembly configured to transmit a power signal to a power receiving unit of at least one wireless power client. The coil assembly includes a first coil and a second coil configured to generate the power signal via a combined magnetic field. A first driver is configured to generate a first current signal on the first coil. A second driver is configured to generate a second current signal on the second coil at a first controllable phase relative to the first current signal to control the combined magnetic field. Other embodiments are disclosed.

20 Claims, 6 Drawing Sheets

(56) References Cited

U.S. PATENT DOCUMENTS

| | | | |
|---|---|---|---|
| 2015/0188365 A1* | 7/2015 | Wang | H01Q 7/00 |
| | | | 307/104 |
| 2015/0236526 A1* | 8/2015 | Jadidian | H02J 5/005 |
| | | | 320/108 |
| 2016/0181855 A1* | 6/2016 | Muurinen | H02J 7/025 |
| | | | 320/108 |
| 2016/0190855 A1* | 6/2016 | Katabi | H02J 7/045 |
| | | | 320/108 |

* cited by examiner

300

400

WIRELESS POWER TRANSMITTER AND METHODS FOR USE THEREWITH

CROSS REFERENCE TO RELATED PATENTS

The present U.S. Utility Patent Application claims priority pursuant to 35 U.S.C. § 119(e) to U.S. Provisional Application No. 62/174,383, entitled "WIRELESS POWER TRANSMITTER AND METHODS FOR USE THEREWITH", filed Jun. 11, 2015, which is hereby incorporated herein by reference in its entirety and made part of the present U.S. Utility Patent Application for all purposes.

BACKGROUND

Technical Field

Various embodiments relate generally to wireless power transmission systems for powering and/or charging of remote devices and more particularly to transmitters of wireless power signals.

Description of Related Art

As is known, integrated circuits are used in a wide variety of products including, but certainly not limited to, portable electronic devices, computers, computer networking equipment, home entertainment, automotive controls and features, and home appliances. As is also known, integrated circuits include a plurality of circuits in a very small space to perform one or more fixed or programmable functions.

Power management can be an important consideration for electronic devices, particularly for mobile devices that operate from limited battery power. Wired chargers require access to electrical power outlets and limit the mobility of the device during charging and may not be practical in hazardous environments. Wireless power systems operate by the transmission of electrical power from a power source to a consuming device without using conductors. In operation, electrical power is transmitted via electromagnetic fields across an intervening space to one or more receiving devices, where it is converted to electric power for charging or operating such a receiving device or its host.

BRIEF DESCRIPTION OF THE SEVERAL VIEWS OF THE DRAWING(S)

Reference will now be made to the accompanying drawings, which are not necessarily drawn to scale, and wherein.

DETAILED DESCRIPTION

Figure 1:
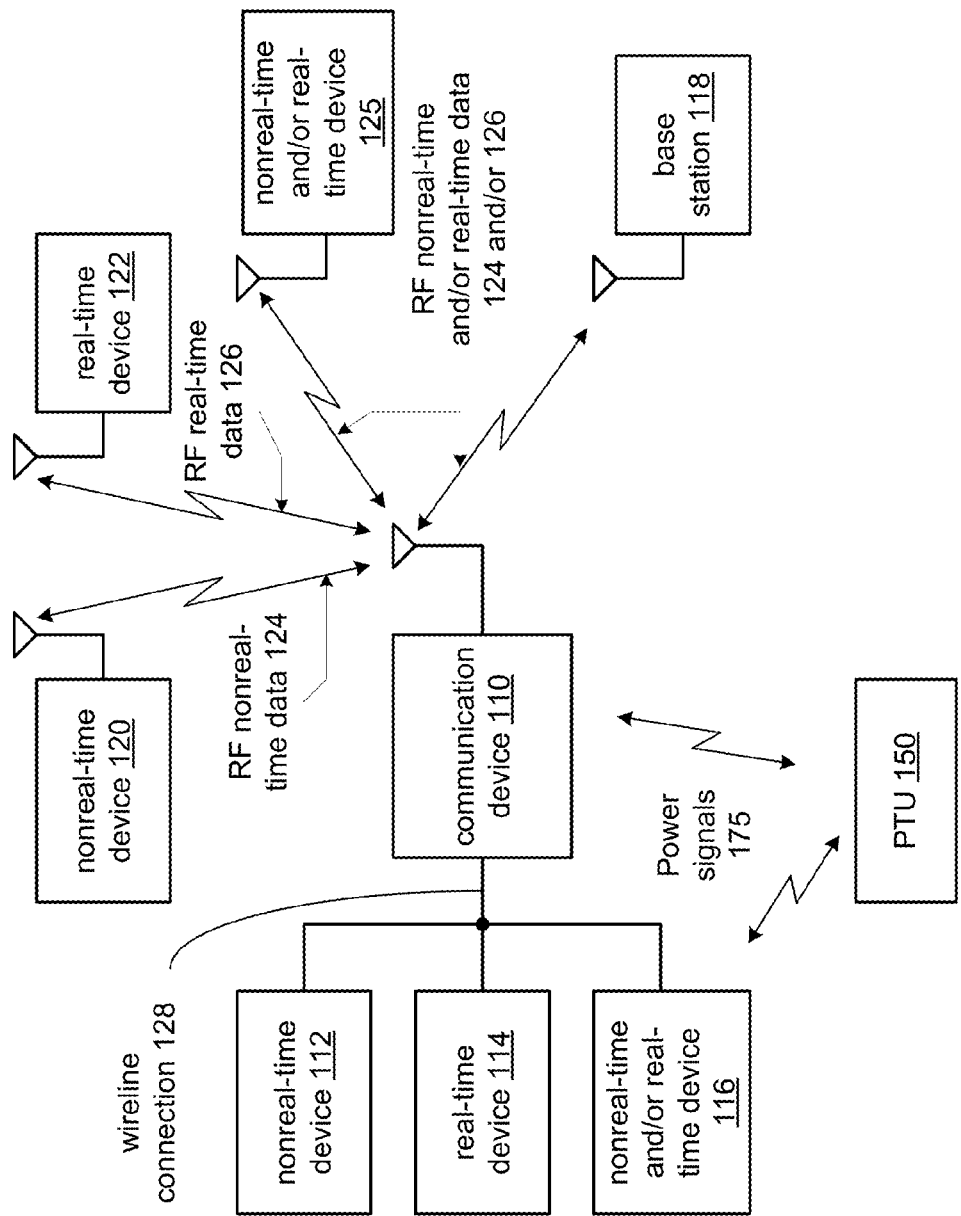
FIG. 1 is a schematic block diagram of an embodiment of a communication system 100.

One or more embodiments are now described with reference to the drawings, wherein like reference numerals are used to refer to like elements throughout. In the following description, for purposes of explanation, numerous details are set forth in order to provide a thorough understanding of the various embodiments. It is evident, however, that the various embodiments can be practiced without these details (and without applying to any particular environment or standard).

In various embodiments, a wireless power transmitter includes a coil assembly configured to transmit a power signal to a power receiving unit of at least one wireless power client. The coil assembly includes a first coil and a second coil configured to generate the power signal via a combined magnetic field. A first driver is configured to generate a first current signal on the first coil. A second driver is configured to generate a second current signal on the second coil at a first controllable phase relative to the first current signal to control the combined magnetic field.

In various embodiments, a wireless power transmitter includes a coil assembly configured to transmit a wireless power signal to a power receiving unit of at least one wireless power client having a single receiving coil, the coil assembly comprising a first coil and a second coil configured to generate the power signal via a combined magnetic field received by the single receiving coil. A first driver is configured to generate a first current signal on the first coil. A second driver is configured to generate a second current signal on the second coil at a first controllable phase relative to the first current signal to control the combined magnetic field received by the single receiving coil.

In various embodiments, a method includes generating a first current signal on a first coil of a coil assembly to generate a first component of a wireless power signal having a first magnetic field; and generating a second current signal on a second coil of the coil assembly at a first controllable phase relative to the first current signal to generate a second component of the wireless power signal having a second magnetic field to control a combined magnetic field of the wireless power signal received by a coil of a power receiving unit.

In accordance with one or more embodiments, a wireless power transmitter is presented for transmitting electrical energy to a power receiving unit of a client device via electromagnetic waves. The wireless power transmitter can include a phased control structure for driving the coils to provide output power control that can be used to eliminate external components like a DC/DC converter and inverter inductors. The wireless power transmitter can provide simpler drive circuitry and in particular, eliminate the need to compensate for variations in inverter inductors, simplifying the interface. A dual coil structure reduces the mutual inductance to half of the original mutual inductance when compared with single coil transmitter designs. This also reduces the reflected resistance in the transmit coil by half as well and allows the use of either half of the input voltage necessary or to transmit four times more power with the same voltage versus single coil implementations.

FIG. 1 is a schematic block diagram of an embodiment of a wireless communication system 100. In particular a communication system 100 is shown that includes a communication device 110 that communicates real-time data 126 and/or non-real-time data 124 wirelessly with one or more other devices such as base station 118, non-real-time device 120, real-time device 122, and non-real-time and/or real-time device 125. In addition, communication device 110 can also optionally communicate over a wireline connection 128 with non-real-time device 112, real-time device 114, non-real-time and/or real-time device 116.

In an embodiment the wireline connection 128 can be a wired connection that operates in accordance with one or more standard protocols, such as a universal serial bus (USB), Institute of Electrical and Electronics Engineers (IEEE) 488, IEEE 1394 (Firewire), Ethernet, small computer system interface (SCSI), serial or parallel advanced technology attachment (SATA or PATA), or other wired communication protocol, either standard or proprietary. The wireless connection can communicate in accordance with a wireless network protocol such as WiHD, WiGig, NGMS, IEEE 802.11a, ac, ad, b, g, n, or other 802.11 standard protocol, Bluetooth, Ultra-Wideband (UWB), WIMAX, or other wireless network protocol, a wireless telephony data/voice protocol such as Global System for Mobile Communications (GSM), General Packet Radio Service (GPRS), Enhanced Data Rates for Global Evolution (EDGE), Long term Evolution (LTE), Personal Communication Services (PCS), Radio Frequency Identification (RFID), Near-field Communications (NFC) or other mobile wireless protocol or other wireless communication protocol, either standard or proprietary. Further, the wireless communication path can include multiple transmit and receive antennas, as well as separate transmit and receive paths that use single carrier modulation to bi-directionally communicate data to and from the communication device 110.

Communication device 110 can be a mobile communication device such as a cellular telephone, a local area network device, personal area network device or other wireless network device, a personal digital assistant, tablet, phablet, ebook reader, game console, personal computer, laptop computer, or other device that performs one or more functions that include communication of voice and/or data via the wireless communication path. In an embodiment, the real-time and non-real-time devices 112, 114, 116, 120, 122 and 125 can be personal computers, laptops, PDAs, mobile phones, such as cellular telephones, devices equipped with wireless local area network or Bluetooth transceivers, FM tuners, streaming video adapters, TV tuners, digital cameras, digital camcorders, keyboards, mice, display devices and other user interface devices, RF tags and/or other near-field communication devices, other peripheral devices or other devices that either produce, process or use audio, video signals or other data or communications.

In operation, the communication device includes one or more applications that include voice communications such as standard telephony applications, voice-over-Internet Protocol (VoIP) applications, local gaming, Internet gaming, email, instant messaging, multimedia messaging, web browsing, audio/video recording, audio/video playback, audio/video downloading, playing of streaming audio/video, office applications such as databases, spreadsheets, word processing, presentation creation and processing and other voice and data applications. In conjunction with these applications, the real-time data 126 includes voice, audio, video and multimedia applications including Internet gaming, etc. The non-real-time data 124 includes text messaging, email, web browsing, file uploading and downloading, electronic payments such as electronic wallet application data, electronic ticket application data, micro-location application data, personal authorization or identification application data, RF tag identification or location data, object identification tracking or location data, inventory control data, shopping application data, etc.

In an embodiment, a power transmitting unit (PTU) 150 is presented for transmitting electrical energy via power signals 175 to a power receiving unit of a power receiving device such as communication device 110, non-real-time device 112, real-time device 114, and/or non-real-time and/or real-time device 116. The power signals 175 include electromagnetic waves that, when received by the power receiving unit of a power receiving device such as communication device 110, non-real-time device 112, real-time device 114, and/or non-real-time and/or real-time device 116, can be converted to electric power for charging or operating such a device. The power transmitting unit 150 includes a wireless power transmitter having one or more features or functions of the various embodiments that are described in greater detail in association with FIGS. 2-8 that follow.

Figure 2:
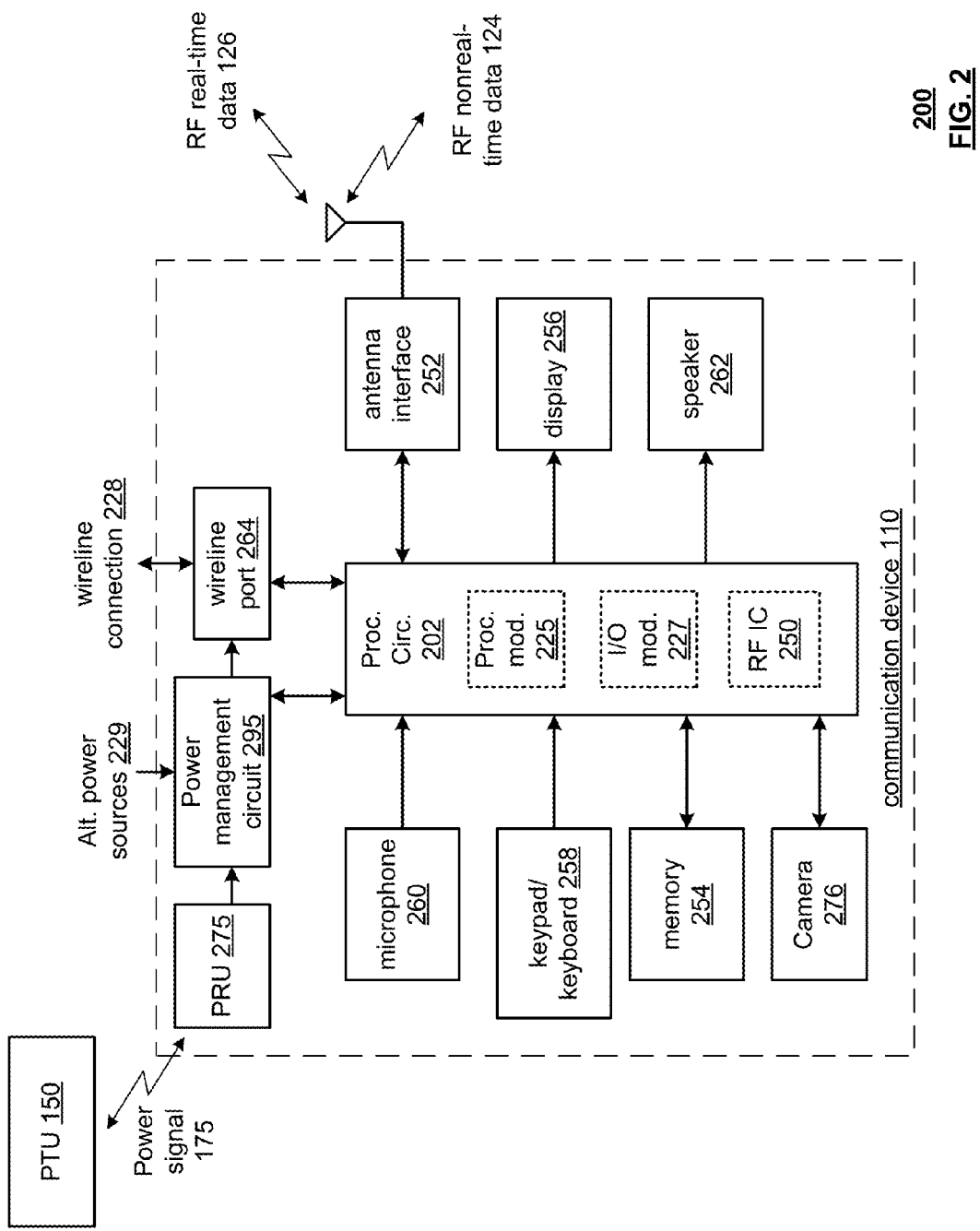
FIG. 2 is a schematic block diagram of an embodiment of a wireless power system 200.

FIG. 2 is a schematic block diagram of an embodiment of a wireless power system 200. In particular, a communication device 110 is shown that includes a processing circuit 202 having an RF IC 250 that operates in conjunction with an antenna interface 252 and antenna, a processing module 225 that operates in conjunction with memory 254 and power management circuit 295, and an input/output (I/O) module 227 that interfaces with wireline port 264, microphone 260, keypad/keyboard 258, speaker 262, display 256, camera 276, antenna interface 252 and wireline port 264 to provide the function and features of the communication device 110.

In operation, RF IC 250 includes RF and baseband modules for formatting and modulating data into RF real-time data 126 and non-real-time data 124 and transmitting this data via an antenna interface 252 and antenna. In addition, I/O module 227 includes the appropriate encoders and decoders for communicating via the wireline connection 228 via wireline port 264, a codec for encoding voice signals from microphone 260 into digital voice signals, a keypad/keyboard interface for generating data from keypad/keyboard 258 in response to the actions of a user, a display driver for driving display 256, such as by rendering a color video signal, text, graphics, or other display data, and an audio driver such as an audio amplifier for driving speaker 262 and one or more other interfaces, such as for interfacing with the camera 276 or the other peripheral devices.

The power management circuit 295 includes one or more DC-DC converters, voltage regulators, current regulators or other power supplies for supplying the processing circuit 202 and optionally the other components of communication device 110 and/or its peripheral devices with supply voltages and or currents (collectively power supply signals) that may be required to power these devices. The power management circuit 295 can receive power from power sources 229 such as one or more batteries, line power and/or from other power sources, not shown. In addition, the power management circuit 295 can operate from power signals 175 received from PTU 150 by power receiving unit 275. In particular, the power receiving unit 275 in configured to convert these electromagnetic signals into a supply voltage and current that can be used by the power management circuit 295 as a source of power.

Figure 3:
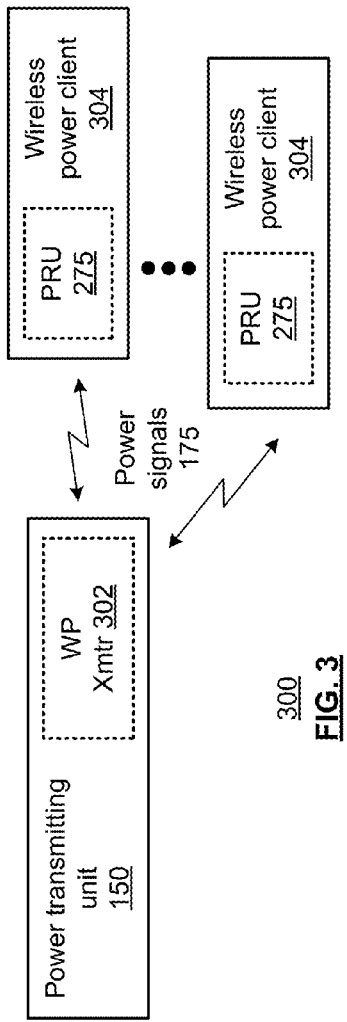
FIG. 3 is a schematic block diagram of an embodiment of a wireless power system 300.

FIG. 3 is a schematic block diagram of an embodiment of a wireless power system 300. A power transmitting unit 150 includes a wireless power transmitter 302 that generates power signals 175 that are received by power receiving units 275 of wireless power clients 304.

While the prior discussions have focused on the use of power transmitting unit 150 for providing power signals to communication device 110 or other devices associated with the communication device 110 such as non-real-time device 112, real-time device 114, and/or non-real-time and/or real-time device 116, power signals 175 can also be used for supplying power to a broader range of wireless power clients 304. In particular, wireless power clients 304 can include lights, home automation devices, small appliances, personal devices such as toothbrushes and razors and other personal devices, drone aircraft, electric cars and other vehicles, medical devices used for patient treatment and diagnosis, and in other wireless power clients 304 that, for example rely on battery power or otherwise do not have a safe, reliable, consistent or renewable source of other electrical power.

Figure 4:
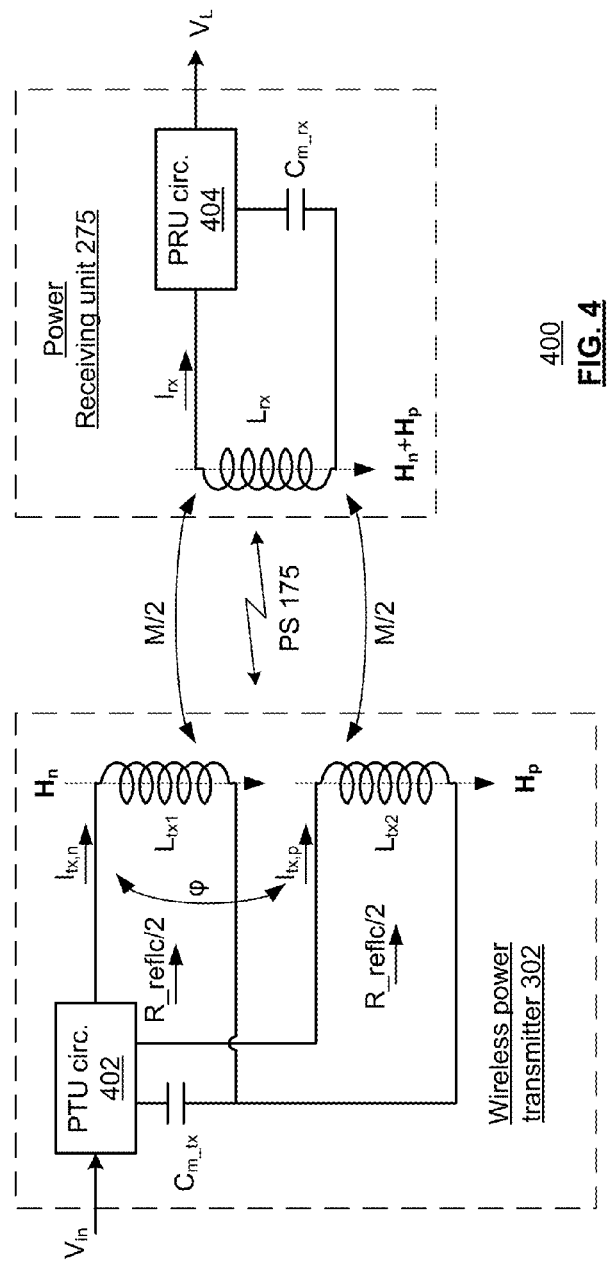
FIG. 4 is a schematic block diagram representation 400 of a wireless power system.
Figures 5, 6:
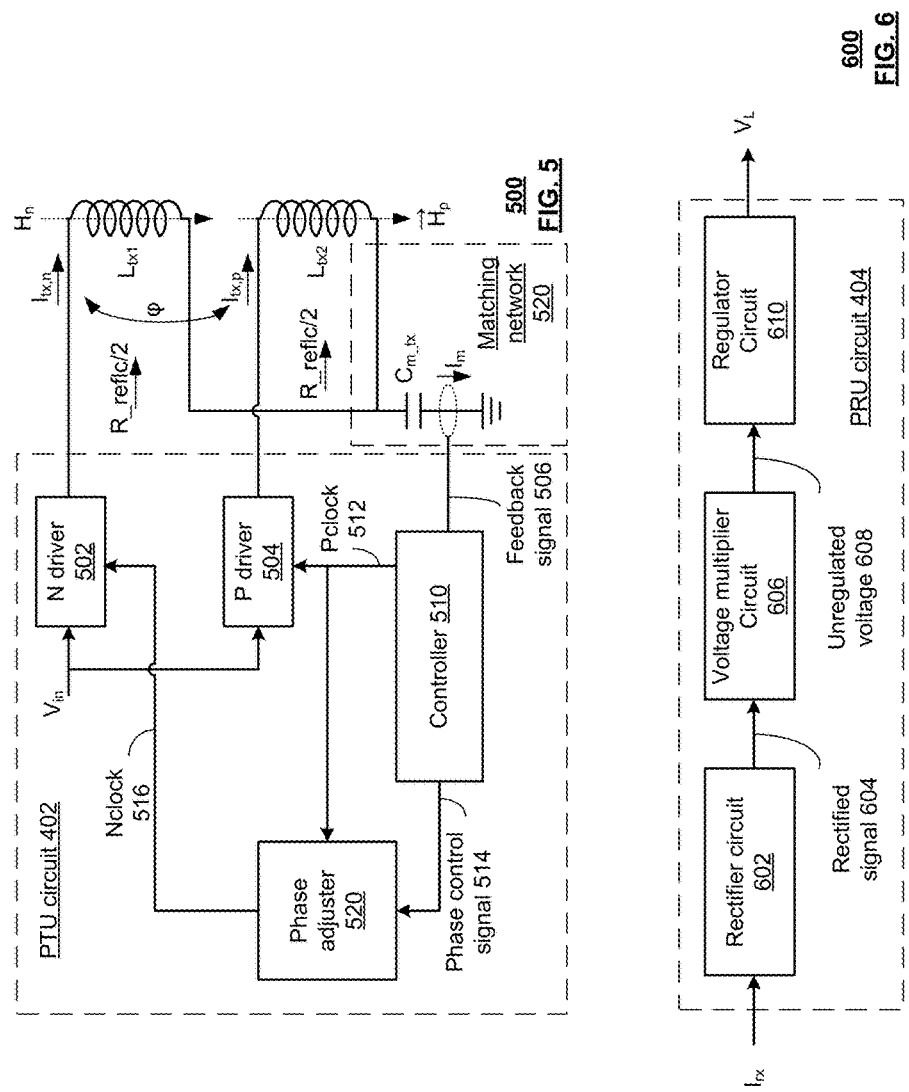
FIG. 5 is a schematic block diagram representation 500 of an embodiment of a wireless power transmitter.
FIG. 6 is a block diagram representation 600 of an embodiment of a power receiving unit circuit.

Examples of wireless power transmitter 302 are presented in conjunction with FIGS. 4 and 5. Examples of power receiving unit 275 are presented in conjunction with FIGS. 4 and 6.

FIG. 4 is a schematic block diagram representation 400 of a wireless power system. In particular, the wireless power system 400 includes a wireless power transmitter 302 having a coil assembly that transmits power signals (PS) 175 to power receiving unit 275, a PTU circuit 402 and compensation capacitor $C_{m\_tx}$. The wireless power transmitter 302 can operate at one or more carrier frequencies in the radio frequency, microwave or millimeter wave frequency ranges from 100 KHz to 300 GHz.

The coil assembly is presented in a coil configuration that includes coils $L_{tx1}$ and $L_{tx2}$. The PTU operates based on input voltage $V_{in}$ to generate current $I_{tx,n}$ and current $I_{tx,p}$ that are vector quantities having a controllable phase $\phi$ relative to one another. The current $I_{tx,n}$ through coil $L_{tx1}$ generates a magnetic field $H_n$ and the current $I_{tx,p}$ through coil $L_{tx2}$ generates a magnetic field $H_p$. The magnetic fields $H_n$ and $H_p$ are vector quantities that combine to form a combined magnetic field vector that is received by the coil $L_{rx}$ of the power receiving unit 275 to generate the current $I_{rx}$. The PRU circuit 404 operates in conjunction with compensation capacitor $C_{m\_rx}$ to convert the current $I_{rx}$ into a DC load voltage $V_L$ for use by the associated wireless power client 304.

Considering the combined total current to be I and the combined magnetic field to be H, $$I_{tx} = I_{tx,n} + I_{tx,p}$$

$$H = H_n + H_p = k_{tx}(\cos(\phi/2))I_{tx}$$

where $k_{tx}$ is a constant. Because the current $I_{rx}$ is in turn proportional to H, the magnitude of the transferred current is dependent on the controllable phase $\phi$. In operation, the PTU circuit 402 can adjust the controllable phase $\phi$ to provide a desired output current control and hence, output power level, eliminating the need for and without necessarily requiring a DC-DC converter or supplementary inductors in such a design. This can boost the efficiency of the design because losses due to DC-DC converter and/or due to supplementary inductors are eliminated.

Further advantages of such a design come to light when comparing a design with two equally sized coils with n turns (windings or spires) each to a similar design with only a single transmit coil with (2n turns). In effect the two coil design represents a split of the single coil into two equal parts. The reflected impedance in each of the two coils is half the reflected impedance (R_reflc) of the single coil design. This allows four times more power to be transmitted for the same input voltage $V_{in}$ (double the power in each half-coil), with the same hardware. In a similar fashion, the input voltage $V_{in}$ can be reduced by half to provide the same power output as the single coil design.

A proof is presented below, assuming the power receiver unit 275 has non-reactive load and the wireless power transmitter 302 has zero loss transmit coils, for ease of calculation. Note that since each of the two transmit coils ($L_{tx1}$ and $L_{tx2}$) have half the number of spires (n) in each-half coil versus 2n for the single coil design, $L_{tx1} = L_{tx2} = L_{tx}/4$, and further, $$Z_{RX} = R_{rec}$$

$$M_{split} = k_{rec} \cdot \sqrt{\frac{L_{TX}}{4} \cdot L_{RX}} = \frac{M}{2}$$

$$2 \cdot V_{TX} \cdot \cos\left(\frac{\varphi}{2}\right) = \left(\frac{1}{j \cdot \omega \cdot C_{m\_tx}} + j \cdot \omega \cdot \frac{L_{TX}}{4}\right) \cdot (I_{TX,P} + I_{TX,N}) + 2 \cdot j \cdot \omega \cdot \frac{M}{2} \cdot I_{RX}$$

$$\varphi = 0 \Rightarrow 2 \cdot V_{TX} = j \cdot \omega \cdot M \cdot I_{RX}$$

$$0 = j \cdot \omega \cdot \frac{M}{2} \cdot (I_{TX,P} + I_{TX,N}) + Z_{RX} \cdot I_{RX} = j \cdot \omega \cdot \frac{M}{2} \cdot I_{TX} \cdot \cos\left(\frac{\varphi}{2}\right) + Z_{RX} \cdot I_{RX}$$

$$0 \stackrel{\varphi=0}{=} j \cdot \omega \cdot \frac{M}{2} \cdot I_{TX} + Z_{RX} \cdot I_{RX}$$

$$\downarrow$$

$$\frac{I_{TX}}{2} = \frac{V_{TX}}{\frac{(\omega \cdot M)^2}{2 \cdot R_{Rec}}} \Rightarrow I_{TX} = 4 \cdot \frac{V_{TX}}{\frac{(\omega \cdot M)^2}{R_{Rec}}}$$

$$P_{transmitted\_split} = 4 P_{transmitted\_nonsplit}$$

where $Z_{rx}$ is the receiver impedance that can be represented by the resistance $R_{rec}$ because $Z_{rx}$ has no reactive component, $\omega$ is the carrier frequency in radians per second, $M_{split}$ represents the mutual inductance of each split coil with the receive coil, M represents the mutual inductance of the non-split coil with the receive coil, $K_{rec}$ is a constant for the receiver, $V_{tx}$ is the transmit voltage of each coil, $P_{transmitted\_split}$ and $P_{transmitted\_nonsplit}$ represent the power transmitted in the split coil and non-split coil configurations, respectively.

FIG. 5 is a schematic block diagram representation 500 of an embodiment of a wireless power transmitter. An example of PTU circuit 402 is presented that includes N driver 502, P driver 504, controller 510 and phase adjustor 520.

In operation, the N driver 502 is configured to generate the current signal $I_{tx,n}$ on the coil $L_{tx1}$. The N driver 502 configured to generate the current signal $I_{tx,p}$ on the coil $L_{tx2}$. The matching network 520 includes a compensation capacitor $C_{m\_tx}$ configured to provide impedance matching to the coil assembly, and in particular provides a reactive impedance that cancels the reactive impedance of the coil assembly at the carrier frequency. A current sensor in the matching network generates the feedback signal 506 that is proportional the compensation current, $I_m$.

The controller 510 is configured to control the controllable phase $\phi$ based on a feedback signal 506 as follows. The controller 510 generates a Pclock 512 for providing a phase/frequency reference for P driver 504 that is used to generate $I_{tx,p}$ at the corresponding phase/frequency. The controller 510 also generates a phase control signal 514 that represents the desired controllable phase $\phi$.

In various embodiments the N driver 502 and P driver 504 can be implemented via power transistors, power amplifiers, or other driver circuits that generate phase controlled current signals $I_{tx,n}$ and $I_{tx,p}$ in response to the phased clock signals, Pclock 512 and Nclock 516. The controller 510 can be implemented via a processing module, frequency and phase controlled oscillator or other circuitry. The phase adjustor 520 can include a phase locked loop, variable phase shift network or other circuitry that is configured to generate Nclock 516, based on the phase control signal 514 and Pclock 512, at the controllable phase ϕ relative to the Pclock 512. For example, the phase adjustor 520 can operate by receiving the Pclock 512 and adjusting the phase of the Pclock 512 based on the phase control signal 514 to generate the Nclock 516 with a relative phase shift of ϕ. The Nclock 516 provides a phase/frequency reference for N driver 502 that is used to generate $I_{tx,n}$ at the corresponding phase/frequency.

As previously discussed, the controller 510 can operate based on compensation feedback to control the magnitude of the power output via control of the controllable phase ϕ corresponding effect on the magnitude of the combined magnetic field H, that effects the receive current $I_{rx}$. In this fashion, changes in operating conditions can be compensated to provide a stable output power level without the need for a DC-DC converter or other feedback.

While the foregoing has described a particular configuration where the coil assembly is split into two equal coils, other splits are possible including unequal coil sizes, splits into 3, 4 or more coils and other configurations, In a particular design the coil assembly includes a third coil, and the wireless power transmitter further includes an additional driver configured to generate another current signal on the third coil at a controllable phase relative to the currents $I_{tx,n}$ and/or $I_{tx,p}$. Further, while the receive coil has been described as a single receive coil, other configurations with two or more coils are likewise possible.

In addition, while the foregoing has described modes of operation where the controller 510 operates to control the phases of the currents $I_{tx,n}$ and/or $I_{tx,p}$, the controller 510 can optionally respond to selection data from a processor to perform in other modes of operation as well. For example, the split coil can include a first coil that operates at a first frequency and/or in conjunction with a first wireless power standard and a second coil that operates at a second frequency and/or in conjunction with a second wireless power standard that is different from the first wireless power standard. In this case, the coils $L_{tx1}$ and $L_{tx2}$ may be of different sizes to correspond with the different frequencies and/or wireless standards. In this example, the power transmitting unit 150 can selectively operate under control of the controller 510 to operate the N driver 502 in accordance with the first wireless power standard, and the P driver 504 in accordance with the second wireless power standard or both contemporaneously.

In yet another mode of operation, the controller 510 operates to control N driver 502 and/or P driver 504 to drive the coils $L_{tx1}$ and $L_{tx2}$ in series as a single inductor. In this case, the total inductance $L_t$ can be represented by $$L_t = L_{tx1} + L_{tx2} + M_{tx1,2}$$

where $M_{tx1,2}$ represents the mutual inductance between the coils $L_{tx1}$ and $L_{tx2}$.

FIG. 6 is a block diagram representation 600 of an embodiment of a power receiving unit circuit. In particular, an example of PRU circuit 404 is shown where a received current $I_{rx}$ is rectified by rectifier circuit 602 into rectified signal 604. Optional voltage multiplier circuit 606 or other boost/buck circuitry increases or decreases the voltage to produce unregulated voltage 608 at a desired level that is optionally regulated by regulator circuit 610 to produce a load voltage $V_L$.

Figure 7:
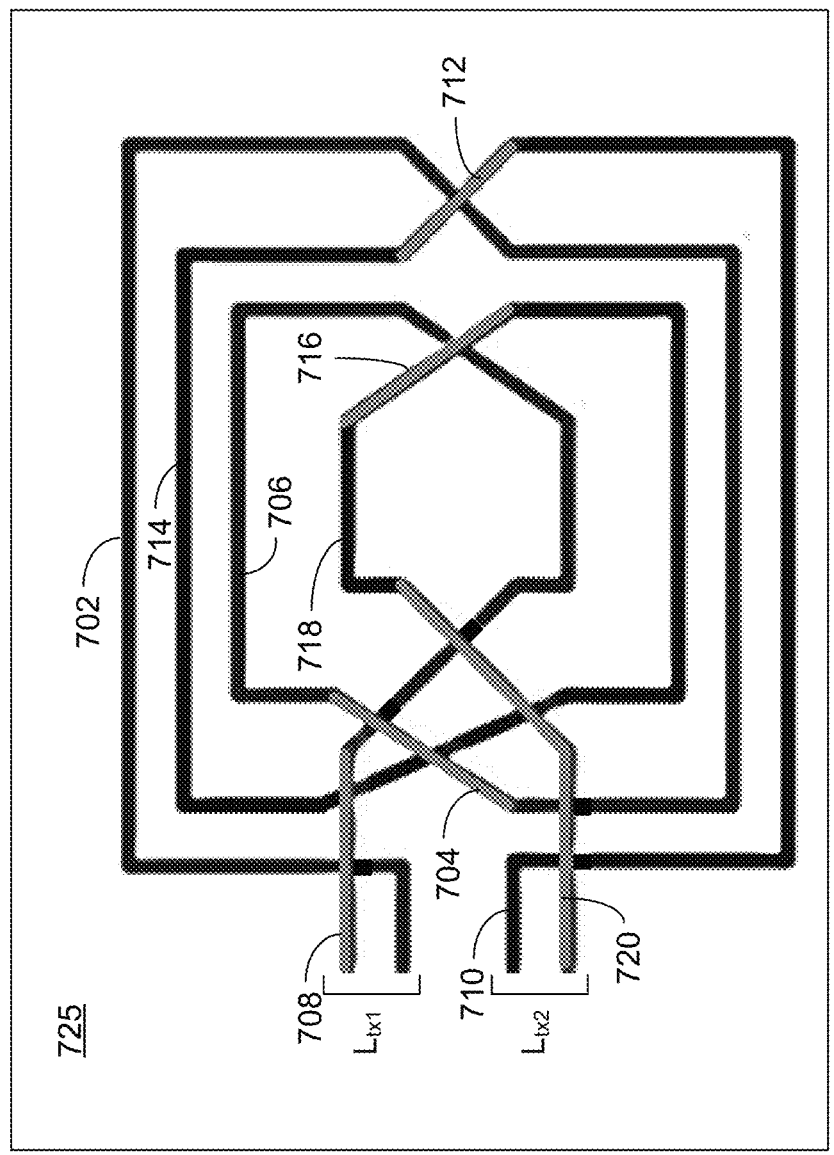
FIG. 7 is a pictorial representation 700 of a top view of an embodiment of a twin coil design.

FIG. 7 is a pictorial representation 700 of a top view of an embodiment of a twin coil design. In particular a twin coil design is presented for implementing coils $L_{tx1}$ and $L_{tx2}$ presented in conjunction with FIGS. 4 and 5. In particular, these coils are implemented via metallic traces 702, 706, 710, 714, and 718 on a substrate 725 with jumper segments 704, 708, 712, 716 and 720 that are metallic segments on another layer of the substrate with vias or other connections that connect the metallic traces 702, 706, 710, 714 into two coils or other jumpers that serve the same purpose. While a particular twin coil configuration is shown, other coil configurations can likewise be employed.

Figure 8:
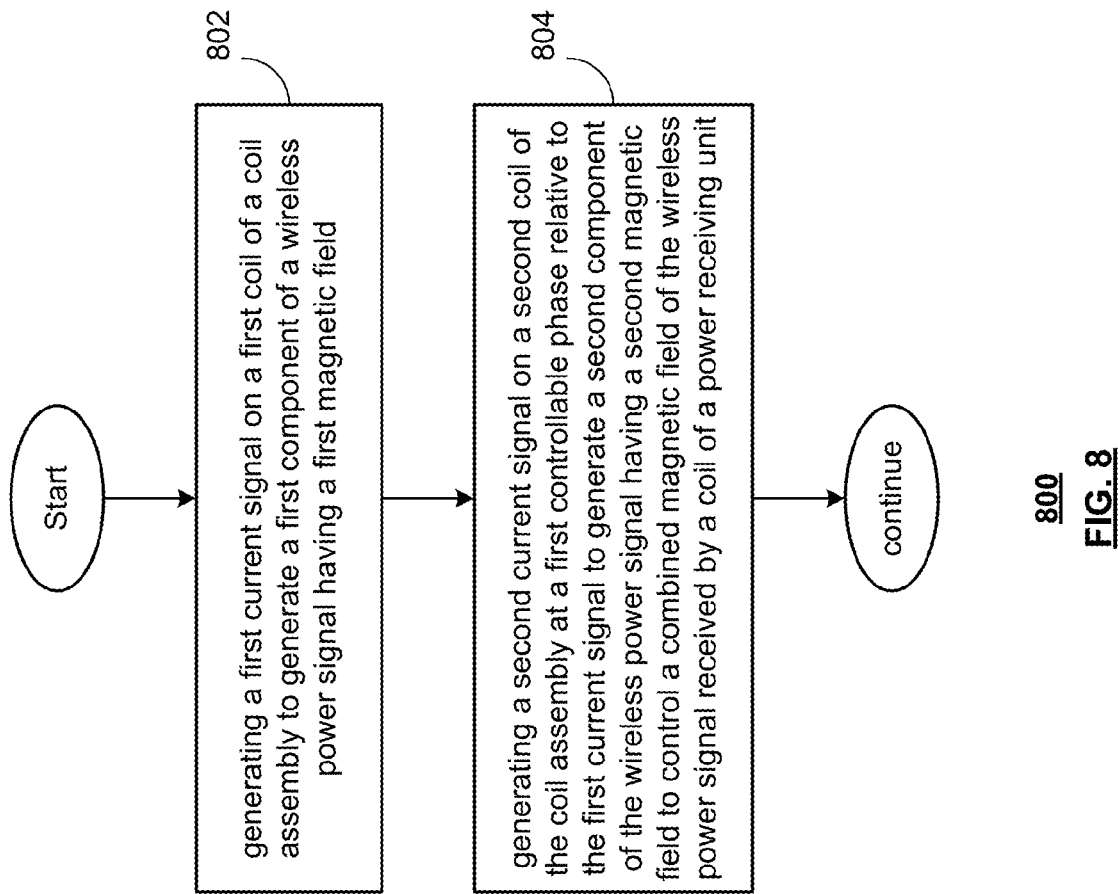
FIG. 8 is a flow diagram 800 of an embodiment of a method.

FIG. 8 is a flow diagram 800 of an embodiment of a method. In particular, a method is presented for use in conjunction with the functions and features described in conjunction with FIGS. 1-7. Step 802 includes generating a first current signal on a first coil of a coil assembly to generate a first component of a wireless power signal having a first magnetic field. Step 804 includes generating a second current signal on a second coil of the coil assembly at a first controllable phase relative to the first current signal to generate a second component of the wireless power signal having a second magnetic field to control a combined magnetic field of the wireless power signal received by a coil of a power receiving unit.

In various embodiments, the method further includes: generating a first clock signal to control a phase of the first current signal; generating a phase control signal at the first controllable phase, based on a feedback signal; and generating a second clock signal based on the phase control signal to control a phase of the second current signal. Generating the second clock signal can includes receiving the first clock signal and adjusting a phase of the first clock signal based on the phase control signal to generate the second clock signal.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A wireless power transmitter comprising:
   a controller configured to respond to selection data from a processor to selectively operate in one of a plurality of modes;
   a coil assembly configured to transmit a power signal to a power receiving unit of at least one wireless power client, the coil assembly comprising a first coil and a second coil configured to generate the power signal via a combined magnetic field;
a first driver configured to generate a first current signal on the first coil;
a second driver configured to generate a second current signal on the second coil, wherein, when operating in a first mode of the plurality of modes, the second current signal is generated at a first controllable phase relative to the first current signal to control the combined magnetic field; and
a matching network that includes a compensation capacitor, wherein the matching network is configured to provide impedance matching to the coil assembly, wherein the matching network further includes a current sensor configured to generate a feedback signal, wherein the feedback signal is proportional to a compensation capacitor current, and wherein the controller is configured to control the first controllable phase based on the feedback signal while operating in the first mode;
wherein, when operating in a second mode of the plurality of modes, the first coil operates at a first frequency in conjunction with a first wireless power standard and wherein the second coil operates at a second frequency in conjunction with a second wireless power standard, wherein the first wireless power standard is different from the second wireless power standard.

2. The wireless power transmitter of claim 1 wherein operating in the second mode includes operating in accordance with the first wireless power standard and the second wireless power standard contemporaneously.

3. The wireless power transmitter of claim 1 wherein the first coil is a first size in accordance with the first frequency, and wherein the second coil is a second size in accordance with the second frequency.

4. The wireless power transmitter of claim 1 wherein the controller generates a phase control signal based on the feedback signal.

5. The wireless power transmitter of claim 4 wherein the controller further generates a first clock signal and the first driver generates the first current signal based on the first clock signal.

6. The wireless power transmitter of claim 5 further comprising:
a phase adjustor configured to generate a second clock signal, based on the phase control signal, at the first controllable phase relative to the first clock signal and wherein the second driver generates the second current signal based on the second clock signal.

7. The wireless power transmitter of claim 1 wherein first coil and the second coil have a same number of spires.

8. The wireless power transmitter of claim 1 wherein the controller controls a magnitude of the power signal via control of a magnitude of the combined magnetic field.

9. The wireless power transmitter of claim 1 wherein the coil assembly further includes an integer number of additional coils, and the wireless power transmitter further comprises:
a corresponding number of additional drivers configured to generate a corresponding number of additional current signals on the additional coils, each at a corresponding controllable phase relative to the first current signal.

10. A wireless power transmitter comprising:
a controller configured to respond to selection data from a processor to selectively operate in one of a plurality of modes;
a coil assembly configured to transmit a wireless power signal to a power receiving unit of at least one wireless power client having a single receiving coil, the coil assembly comprising a first coil and a second coil configured to generate the wireless power signal via a combined magnetic field received by the single receiving coil;
a first driver configured to generate a first current signal on the first coil; and
a second driver configured to generate a second current signal on the second coil;
wherein, when operating in a first mode of the plurality of modes, the second current signal is generated at a first controllable phase relative to the first current signal to control the combined magnetic field received by the single receiving coil;
wherein, when operating in a second mode of the plurality of modes, the first coil operates at a first frequency in conjunction with a first wireless power standard and wherein the second coil operates at a second frequency in conjunction with a second wireless power standard, wherein the first wireless power standard is different from the second wireless power standard; and
wherein, when operating in the first mode of the plurality of modes, the controller is configured to generate a phase control signal based on a feedback signal, and to generate a first clock signal, wherein the first driver generates the first current signal based on the first clock signal; and wherein the wireless power transmitter further comprises:
a phase adjustor configured to generate a second clock signal, based on the phase control signal, at the first controllable phase relative to the first clock signal and wherein the second driver generates the second current signal based on the second clock signal.

11. The wireless power transmitter of claim 10 further comprising:
a matching network that includes a compensation capacitor, wherein the matching network configured to provide impedance matching to the coil assembly, and wherein the matching network further includes a current sensor configured to generate the feedback signal, wherein the feedback signal is proportional to a compensation capacitor current, and wherein the controller is configured to control the first controllable phase based on the feedback signal while operating in the first mode.

12. The wireless power transmitter of claim 10 wherein the first coil is a first size in accordance with the first frequency, and wherein the second coil is a second size in accordance with the second frequency.

13. The wireless power transmitter of claim 10 wherein the controller controls a magnitude of the wireless power signal via control of a magnitude of the combined magnetic field.

14. The wireless power transmitter of claim 10 wherein first coil and the second coil have a same number of spires.

15. The wireless power transmitter of claim 10 wherein the coil assembly further includes an integer number of additional coils, and the wireless power transmitter further comprises:
a corresponding number of additional drivers configured to generate a corresponding number of additional current signals on the additional coils each at a corresponding controllable phase relative to the first current signal.

16. A method comprising:

receiving selection data from a processor to selectively operate in one of a plurality of modes including a first mode of operation and a second mode of operation;

generating a first current signal on a first coil of a coil assembly to generate a first component of a wireless power signal having a first magnetic field;

generating a first clock signal to control a phase of the first current signal when operating in the first mode of operation;

generating a second current signal on a second coil of the coil assembly, wherein, when operating in the first mode of operation, the second current signal is generated at a first controllable phase relative to the first current signal to generate a second component of the wireless power signal having a second magnetic field to control a combined magnetic field of the wireless power signal received by a coil of a power receiving unit, wherein the second current signal is generated at a first controllable phase relative to the first current signal by:

generating a phase control signal at the first controllable phase, based on a feedback signal when operating in the first mode of operation; and generating a second clock signal based on the phase control signal to control a phase of the second current signal when operating in the first mode of operation;

wherein, when operating in the second mode of operation, the first coil operates at a first frequency in conjunction with a first wireless power standard and wherein the second coil operates at a second frequency in conjunction with a second wireless power standard, wherein the first wireless power standard is different from the second wireless power standard.

17. The method of claim 16 wherein generating the second clock signal includes:

receiving the first clock signal; and adjusting a phase of the first clock signal based on the phase control signal to generate the second clock signal.

18. The method of claim 16 wherein the second mode of operation includes operating in accordance with the first wireless power standard and the second wireless power standard contemporaneously.

19. The method of claim 16 wherein the first coil is a first size in accordance with the first frequency, and wherein the second coil is a second size in accordance with the second frequency.

20. The method of claim 16 wherein first coil and the second coil have a same number of spires.

* * * * *